United States Patent [19]

Motley et al.

[11] 4,061,977

[45] Dec. 6, 1977

[54] PHASE TRACKING NETWORK

[75] Inventors: David M. Motley, Santa Ana; Andrew M. Kameya, Costa Mesa, both of Calif.

[73] Assignee: Hycom Incorporated, Irvine, Calif.

[21] Appl. No.: 687,349

[22] Filed: May 17, 1976

[51] Int. Cl.² .............................................. H03H 7/36
[52] U.S. Cl. ..................................... 325/323; 333/18; 328/155
[58] Field of Search ............................ 325/41, 42, 65; 235/156; 328/155, 133, 134, 139, 73, 74, 75; 333/18; 179/15 BS; 128/69.1

[56] References Cited

U.S. PATENT DOCUMENTS

| 3,845,390 | 10/1974 | De Jager et al. | 333/18 X |
| 3,962,637 | 6/1976 | Motley et al. | 333/18 X |
| 3,992,616 | 11/1976 | Acker | 235/156 |

Primary Examiner—Benedict V. Safourek
Attorney, Agent, or Firm—Gordon L. Peterson

[57] ABSTRACT

A phase tracking network comprising a phase correction network for correcting at least some of the phase error of an input signal to provide a phase corrected signal having components in first and second channels and a detector responsive to the phase corrected signal for providing a detected signal having first and second components in the first and second channels. An error calculator provides a phase correction signal back to the phase correction apparatus which responds to the phase correction signal to correct the phase error of the input signal. The phase error signal contains substantially no noise from the first channel at least when the first component of the detected signal is zero and contains substantially no noise from the second channel at least when the second component of the detected signal is zero. This is accomplished by utilizing the error calculator to provide a first control signal which represents a first fixed value, zero, and a second fixed value when the first component of the detected signal is ideally positive and not zero, ideally zero, and ideally negative and not zero, respectively. The error calculator similarly provides a second control signal for the second component of the detected signal.

18 Claims, 2 Drawing Figures

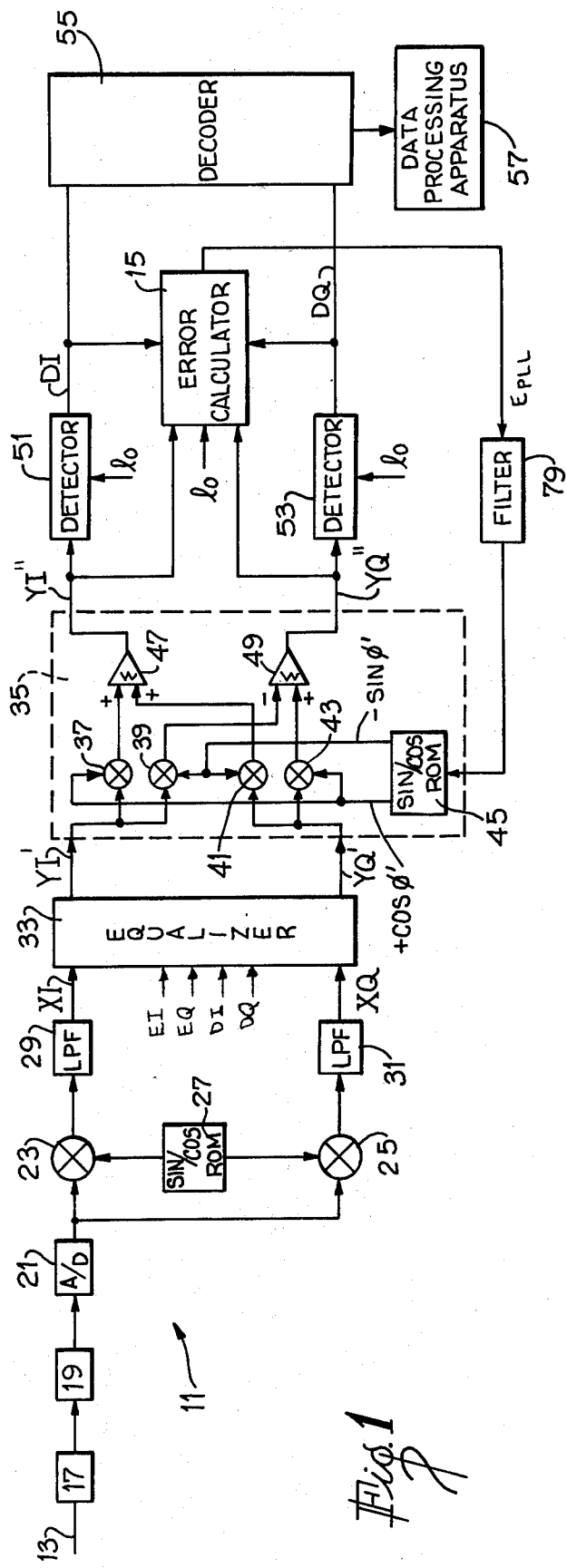
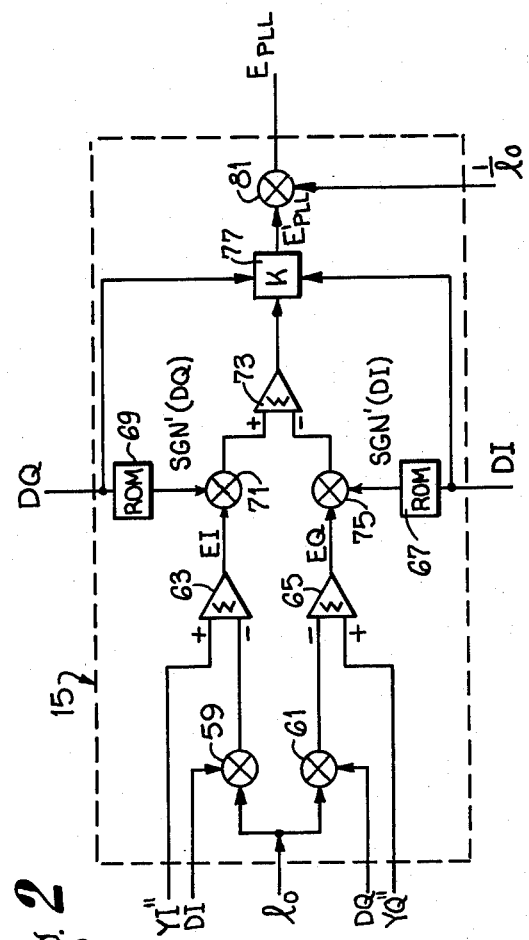
Fig. 1
Fig. 2

PHASE TRACKING NETWORK

BACKGROUND OF THE INVENTION

Telephone lines, when used to transmit a data signal between a transmitter and a receiver, introduce various disturbances to the transmitted signal. For example, the telephone lines may produce various kinds of phase error such as phase jitter, phase offset, and frequency offset. Phase jitter is rapid variations in the difference between the phase of the modulation carrier of the transmitter and the phase of the demodulation carrier of the receiver. Phase offset is an absolute time differential between the phase of the transmitter and the phase of the receiver. Frequency offset is the shifting of the entire spectrum of the transmitted signal. With respect to time, frequency offset has a generally linear phase characteristic. Although telephone lines introduce disturbances other than phase error, the present invention is primarily concerned with phase error.

Common Assignee's copending application Ser. No. 548,567 filed Feb. 10, 1975, now U.S. Pat. No. 3,971,996 and entitled PHASE LOCK LOOP discloses a receiver adapted to receive a transmitted signal from telephone lines. This copending application is a continuation of application Ser. No. 376,464 filed July 5, 1973, now abandoned, which in turn is a continuation-in-part of application Ser. No. 324,657 filed on Jan. 18, 1973, now abandoned. In the receiver of the copending application, the transmitted signal is demodulated and passed through low-pass filters to an equalizer which corrects the delay and attenuation distortion of the signal to provide an equalized signal. The phase error of the equalized signal is corrected in a phase correcting network to provide a phase corrected signal and the data in the phase corrected signal is detected by detectors. An error calculator responds to the phase corrected and detected signals to provide a phase error signal which is representative of phase error. The phase error signal is fed back to the phase correction network where appropriate adjustments are made to compensate for phase error.

The system of the copending application performs very satisfactorily. However, the error calculator does allow noise to be introduced into the phase error signal from one channel even when the signal in that channel does not represent any data or information.

A phase error equation which eliminates noise in the phase error signal from a channel when that channel contains no data or information is disclosed as equation 17 in U.S. Pat. No. 3,669,511 which issued to D. M. Motley, et al. However, this equation is relatively difficult for the error calculator to implement in that full accuracy multiplications are required and a storage capacity to hold large numbers, such as 10-bit numbers, is required.

SUMMARY OF THE INVENTION

The present invention provides an error calculator which does not introduce noise into the phase error signal from a channel which does not contain data or information. In addition, the error calculator is easy to implement in that no complex multiplying is required.

The error calculator of this invention implements an error equation which contains at least two terms in the numerator. One of these terms is zero if the signal in one of the channels contains no data, and the other of the terms is zero if the signal in the other of the channels contains no data. Accordingly, whenever a channel contains no data, then that channel cannot introduce noise into the phase error signal.

The cost and complexity of the implementation is reduced in at least two ways. First, each of the terms in the numerator is a product of two values. One of these values in each of the terms is a first fixed value, zero, or a second fixed value when the component of the detected signal in the associated channel is ideally positive and not zero, ideally zero, and ideally negative and not zero, respectively. Preferably the first and second fixed values are $+1$ and $-1$, respectively. Multiplication by these three values is easily and inexpensively accomplished.

Secondly, the phase error equation has a denominator which does not require any multiplication. Rather, the denominator requires only the summing of absolute values of the detected signals in the two channels.

Receivers adapted for use with telephone lines typically employ a variable reference signal which is used for various purposes by the receiver, including the detection of the data in the phase corrected signal. The reference signal is the receiver's estimate of the level of the incoming signal, and accordingly, the reference signal varies with the incoming signal. It can be shown that, for various phase error equations, the phase error signal is approximately equal to the product of the reference signal and phase error angle. Because the reference signal is variable, this variation is reflected in the phase error signal and hence in gain changes of the phase lock loop, and this can adversely effect the system's performance. In order to eliminate this variation, the present invention divides out the variable reference signal level so that the phase error signal is made substantially independent of variations in the reference signal. This feature of the invention may be employed with or without the feature of the invention which eliminates noise in the phase error signal from a channel having a signal component which contains no information.

The invention, together with further features and advantages thereof, can best be understood by reference to the following description taken in connection with the accompanying illustrative drawing.

BRIEF DESCRIPTION OF THE DRAWING

FIG. 1 is a block diagram of a receiver constructed in accordance with the teachings of this invention.

FIG. 2 is a schematic block diagram of an error calculator constructed in accordance with the teachings of this invention.

DESCRIPTION OF THE PREFERRED EMBODIMENT

FIG. 1 shows a receiver 11 which is adapted to be coupled to a telephone line 13. The receiver 11 includes an error calculator 15 (FIGS. 1 and 2), and except for the error calculator 15, the receiver 11 may be conventional. The error calculator 15 can be used with many different kinds of receivers, and the receiver 11 is merely illustrative. For example, the error calculator 15 can be used in analog and digitally implemented systems and with partial response and non-partial response signalling. The error calculator 15 is adapted for use with any receiver having first and second channels, and, as such, it can be used with quadrature amplitude modulation (QAM), complex amplitude modulation (CAM), phase shift keying (PSK), etc.

Before discussing the error calculator 15 in detail, it would be helpful to briefly describe the receiver 11, it being understood that the error calculator 15 can be employed with other kinds of receivers. For example, the receiver 11, except for the error calculator 15, may be identical to the receiver shown in common Assignee's copending application Ser. No. 548,567 filed Feb. 10, 1975, and allowed Mar. 24, 1976, (now U.S. Pat. No. 3,971,996) and the disclosure of this copending application is incorporated by reference herein. FIG. 1 is a simplified version of FIG. 3 of this copending application. The receiver 11 may be utilized with various different kinds of transmitters, including the transmitter disclosed in the copending application.

The signal transmitted on the telephone line 13 will be distorted as a result of its transmission on the telephone line. For example, the transmitted signal will typically contain various disturbances, including phase error and asymmetrical and symmetrical delay and attenuation distortion. The distorted transmitted signal is introduced through data access equipment 17 to an analog bandpass filter and automatic gain control 19 which selects the desired passband and signal level. An analog-to-digital converter or sampler 21 is provided to sample the incoming analog signal at a sampling rate, such as 9,600 times per second, corresponding to some multiple of the symbol rate of the transmitter (not shown). The sampling rate can be controlled in various different ways, including the manner described in the above-identified copending application. The analog-to-digital converter 21 provides the analog signal with a digital format, which digital format is retained throughout the remaining components of the receiver 11.

The digital signal from the analog-to-digital converter 21 is separately multiplied in each of a pair of multipliers 23 and 25 by values obtained from a sine/cosine read only memory (ROM) 27. In this manner, the digital signal is non-coherently demodulated and separated into an inphase channel (I channel) and a quadrature channel (Q channel).

The signals from the multipliers 23 and 25 are introduced to digital low-pass filters 29 and 31 which select and shape the baseband from the demodulated signals. If the signals from the low-pass filters 29 and 31 were ideal, the data represented thereby could be detected and decoded immediately following the filters. However, because the signal components at the outputs of the filters 29 and 31 are typically not ideal, but contain various disturbances, including phase error and delay and attenuation distortion, these signal components are designated by the notation XI and XQ at the outputs of the filters 29 and 31, respectively.

The signal components XI and XQ are introduced to an equalizer 33 which substantially removes the delay and attenuation distortion to provide an equalized signal having components YI' and YQ' in the I and Q channels, respectively. The equalizer 33 may be of various different types, as the present invention is not dependent upon the particular kind of equalizer used. For example, the equalizer 33 may be an automatic transversal equalizer as disclosed in the above-identified copending application or it may be a manually-adjusted equalizer.

The signal components YI' and YQ' from the equalizer 33 typically include phase error $\phi$. The signal components YI' and YQ' are introduced to a phase correction network 35 which substantially removes the phase error to provide a phase corrected signal having components YI'' and YQ'' in the I and Q channels, respectively, with the double prime indicating that some phase error is still present in the phase error signal. Ideally, the phase correction network corrects completely for phase error, and the components of the ideal phase corrected signal, which contains no phase error, are designated YI and YQ. However, for some phase error, the relationships between the signals at the input and the output of the phase correction network 35 can be expressed as follows:

$$YI'' = YI' \cos\phi' - YQ' \sin\phi'$$

$$YQ'' = YQ' \cos\phi' + YI' \sin\phi' \quad \text{(Equations 1)}$$

The phase correction network 35 implements equation 1. In the embodiment illustrated, the phase correction network 35 includes four multipliers 37, 39, 41 and 43, a sine/cosine ROM 45 and two adders 47 and 49. The signal component YI' provides the multiplicand for the multipliers 37 and 39, and the signal component YQ' provides the multiplicand for the multipliers 41 and 43. The sine/cosine ROM 45 provides cosine and $-$sine values of some variable angle $\phi'$. The cosine $\phi'$ signal is introduced to the multipliers 37 and 43 to multiply the respective multiplicands therein. Similarly, the $-$sine $\phi'$ signal is introduced to the multipliers 39 and 41 to multiply the respective multiplicands therein. The adder 47 is coupled to add the products from the multipliers 37 and 41, and the adder 49, which is a differential adder, is coupled to the multipliers 39 and 43 to provide the difference between their respective products. It follows that the signals from the adders 47 and 49, which are introduced to the I and Q channels, respectively, can be expressed in accordance with equations 1.

If the angle $\phi'$ provided by the ROM 45 is equal to the angle $\phi$ which represents the total phase error, then all of the phase error is corrected by the phase correction network and $YI'' = YI$ and $YQ'' = YQ$. Although this is the ideal condition, in practice the angle $\phi'$ provided by the ROM 45 may differ slightly from the phase error angle $\phi$. For this reason, it is desirable that the angle $\phi'$ provided by the sine/cosine ROM 45 to be updated in order to compensate for variations in the phase error. This updating function is accomplished, in substantial part, by the error calculator 15 as described more particularly hereinbelow.

The phase corrected signal components YI'' and YQ'' are introduced to detectors 51 and 53, respectively. The basic function of the detectors 51 and 53 is to detect the data in the phase corrected signal components YI'' and YQ'' to provide a detected data signal having components DI and DQ in the I and Q channels, respectively. The detectors 51 and 53 may be of the type described in the above-identified copending application. Generally, the detectors 51 and 53 are provided with a variable level reference signal $l_o$. Each of the detectors 51 and 53 compares the incoming signal level with the threshold established by functions of the variable reference signal $l_o$. The values of the signal components DI and DQ depend upon the particular encoding operation used in the system.

The reference signal $l_o$ used to establish the threshold levels in the detectors 51 and 53 is variable. The variable reference signal $l_o$ is the receiver's estimate of the level of the incoming signal on the telephone line 13. If the incoming signal on the telephone line 13 were represented as a vector, then the value of the reference signal $l_o$ is the receiver's estimate of vector length. The variable reference signal $l_o$ can be provided in various different ways by those skilled in the art, and the present invention is not dependent upon the provision of the reference signal $l_o$ in any particular manner. By way of example, and not by way of limitation, the reference signal $l_o$ can be provided as disclosed in the copending application where such variable level reference signal is designated $\hat{l}_o$.

The detected data signals DI and DQ are introduced to a decoder 55. The decoder differentially decodes and derandomizes the signals and introduces them to a suitable data processing apparatus 57.

FIG. 2 shows one embodiment of the error calculator of this invention. The error calculator 15 is adapted to implement the equation:

$$E'_{PLL} = \frac{EI\,SGN'\,(DQ) - EQ\,SGN'\,(DI)}{|DI| + |DQ|} \quad \text{(Equation 2)}$$

where $E'_{PLL}$ is the phase error signal, $EI = YI'' - DIl_o$, $EQ = YQ'' - DQl_o$, $SGN'$ (DQ) equals 1, zero, and $-1$ when DQ is ideally positive and not zero, zero, and ideally negative and not zero, respectively, $SGN'$ (DI) equals 1, zero, and $-1$ when DI is ideally positive and not zero, zero, and ideally negative and not zero, respectively, $|DI|$ is the absolute value of the detected data signal in the I channel, $|DQ|$ is the absolute value of the detected data signal in the Q channel.

The error calculator 15, in the embodiment illustrated, includes two multipliers 59 and 61 and two differential adders 63 and 65. The multiplier 59 multiplies the variable reference signal $l_o$ and the detected data signal in the I channel, DI and introduces the product to the negative terminal of the differential adder 63. Similarly, the multiplier 61 multiplies the variable reference signal $l_o$ and the detected data signal in the Q channel, DQ and introduces the product to the negative terminal of the differential adder 65. The phase corrected signal components YI'' and YQ'' are introduced to the other terminals of the adders 63 and 65, respectively. The adder 63 algebraically sums its inputs to provide at its output an I channel component EI of a system error signal and the adder 65 similarly provides a Q channel component EQ of the system error signal in accordance with the following equations:

$EI = YI'' - DIl_o$ $EQ = YQ'' - DQl_o$ (Equations 3)

In an ideal system with no phase error:

$YI'' = YI = DIl_o$ $YQ'' = YQ = DQl_o$ (Equations 4)

In this event the error signal components EI and EQ are both zero. In actual practice, however, the components EI and EQ of the system error signal will have some value other than zero. The components EI and EQ of the system error signal which are functions of the variable reference signal can be used for various purposes by the receiver, including updating of the equalizer. In the embodiment illustrated, the signals EI, EQ, DI, and DQ are all used to update the equalizer as described in U.S. Pat. No. 3,906,347.

The present invention is characterized by the presence of the control signals SGN' (DI) and SGN' (DQ) being in different terms of the numerator of the phase error equation (equation 2). The values of SGN' (DI) and SGN' (DQ) are dependent solely on the ideal values of the detected signal components DI and DQ, respectively. Each of the signals SGN' (DI) and SGN' (DQ) can have any one of three fixed values. The preferred relationships between SGN' (DI) and DI and the preferred relationships between SGN' (DQ) and DQ are set forth below equation 2. While these relationships are preferred for ease of implementation, other relationships can be established, if desired. However, in order to assure that the phase error signal will not contain noise from any channel which does not contain data, the values of the SGN' (DI) and SGN' (DQ) should be zero whenever the associated detected data signal is zero.

The values for SGN' (DI) and SGN' (DQ) can be generated in various different ways, and in the embodiment illustrated, ROMS 67 and 69 are utilized. The values +1, zero, and −1 are stored in each of the ROMS 67 and 69, and $\phi$−values are provided at the output of the ROMS in response to input signals DI and DQ. The table below sets forth, for assumed values of DI and DQ, the preferred values of SGN' (DI) and SGN' (DQ):

| DI | DQ     | SGN' (DI) | SGN' (DQ) |
|----|--------|-----------|-----------|
| 0  | 1.732  | 0         | 1         |
| 2  | 1.732  | 1         | 1         |
| 1  | 0.000  | 1         | 0         |
| 2  | −1.732 | 1         | −1        |
| 0  | −1.732 | 0         | −1        |
| −2 | −1.732 | −1        | −1        |
| −1 | 0.000  | −1        | 0         |
| −2 | 1.732  | −1        | 1         |

A multiplier 71 multiplies the error signal component EI by SGN' (DQ) and introduces the product to the positive terminal of a differential adder 73. Similarly, a multiplier 75 multiplies the error signal component EQ by the SGN' (DI) signal and introduces the product to the negative terminal of the adder 73. The adder 73 provides the difference between its two inputs to thereby provide a signal in accordance with the numerator of equation 2 and introduces this signal to a divider 77. The divider 77 divides the value of the input signal by the denominator of equation 2; i.e., the sum of the absolute values of the detected signal components DI and DQ. The absolute values of the detected signal components DI and DQ depend upon the particular encoding operation used in the system, and although various different encoding operations may be used, one suitable encoding method is disclosed in the above-identified copending application. The output of the divider 77 is the phase error signal $E'_{PLL}$. This signal is provided with a minimum number of steps, and due to the simplicity of the SGN' (DI), SGN' (DQ), and absolute value terms employed, the implementation of the error calculator 15 is simple and inexpensive.

The phase error signal $E'_{PLL}$ obtained at the output of the divider 77 can be fed back to the sine/cosine ROM of the phase correction network 35. The ROM 45 responds to this error signal to select an updated value of $\phi'$ and to provide the cosine $\phi-$ and $-$sine $\phi'$ terms based upon the updated value of $\phi'$. If desired, the feedback loop may contain a filter 79 as shown and described in the above-identified copending application.

One disadvantage of using the signal $E'_{PLL}$ as the phase error signal is that the phase error signal would then depend upon the variable reference signal $l_o$. As discussed above, the variable reference signal $l_o$ varies in accordance with the receiver's estimate of the level of the incoming signal on the telephone line 13. This variation is reflected in the phase error signal, and hence in the gain of the feedback loop to the ROM 45 and this can adversely effect system performance. In order to eliminate this variation, the signal $E'_{PLL}$ is multiplied by the reciprocal of the variable reference signal $l_o$ by a multiplier 81 to provide the phase error signal $E_{PLL}$. This makes the phase error signal $E_{PLL}$ substantially independent of variations in the variable reference signal $l_o$. As the value of the reference signal $l_o$ changes, the new values are introduced simultaneously to the multipliers 59, 61 and 81.

In order that the effects of variation in the reference signal $l_o$ can be substantially eliminated by multiplying the signal $E'_{PLL}$ by the reciprocal of $l_o$, it is necessary that the signal $E'_{PLL}$ be approximately equal to $l_o \phi''$ where $\phi''$ is the phase error in radians of the phase corrected signal. From the analysis set forth below, it can be seen that the phase error as defined in equation 2, is approximately reducible to $-l_o\phi''$ for small angles of $\phi''$.

The signal components $YI''$ and $YQ''$ from the phase correction network 35 contain some phase error and can be written as follows:

$$YI'' = YI \cos\phi'' - YQ \sin\phi''$$

$$YQ'' = YQ \cos\phi'' + YI \sin\phi''$$ (Equations 5)

where
$YI$ and $YQ$ are components of the ideal phase corrected signal in the I and Q channels, respectively, which components contain no phase error, and
$\phi''$ is the phase error of the signal components $YI''$ and $YQ''$ and is equal to $\phi' - \phi$.

The signal components $YI$ and $YQ$ are ideally equal to $DIl_o$ and $DQl_o$, respectively. Substituting these values into equations 5, the following is obtained:

$$YI'' = DIl_o \cos\phi'' - DQl_o \sin\phi''$$

$$YQ'' = DQl_o \cos\phi'' + DIl_o \sin\phi''$$ (Equations 6)

In the error calculator 15, the error signal component EI is formed by subtracting, using the adder 63, $DIl_o$ from $YI''$. Similarly, the error signal component EQ is formed by subtracting, using the adder 65, $DQl_o$ from $YQ''$. By substituting for $YI''$ and $YQ''$ in equations 3 and assuming that $\phi''$ is small so that $\cos\phi''$ approaches 1, then $$EI = -DQl_o \sin\phi'' \text{ and}$$

$$EQ = DIl_o \sin\phi''$$ (Equations 7)

Substituting these values into equation 2 yields the following equation:

$$E'_{PLL} = -l_o \sin\phi''$$ (Equation 8)

which for small angles of $\phi$ is $$-l_o \phi''$$ (Equation 9)

It can be seen from the foregoing that the signal $E'_{PLL}$ introduced to the multiplier 81 in the error calculator 15 is approximately equal to $-l_o \phi''$ where $\phi''$ is expressed in radians. Accordingly, by multiplying this signal by the reciprocal of $l_o$, the resulting error signal $E_{PLL}$ is representative solely of phase error and is independent of the reference signal $l_o$. Of course, the multiplication by the reciprocal of $l_o$ can be carried out at various different places within the error calculator 15.

It will be appreciated by those skilled in the art that various modifications can be made to the error calculator 15 and to the phase error equation implemented thereby. For example, the multiplier 81 can be eliminated, but at the expense of having the phase error signal vary with the reference signal $l_o$. In addition, the terms EI and EQ can be replaced in some applications by the phase corrected signal components in equation 2.

Although an exemplary embodiment of the invention has been shown and described, many changes, modifications and substitutions may be made by one having ordinary skill in the art without necessarily departing from the spirit and scope of this invention.

We claim:

1. An apparatus adapted to receive an input signal which contains phase error comprising:

phase correction means responsive to the input signal for correcting at least some of the phase error to provide a phase corrected signal having components in first and second channels;

detector means responsive to the phase corrected signal for providing a detected signal having first and second components in the first and second channels, respectively, each of said components of the detected signal having an ideal value which can vary from positive to negative and at least at times equals zero;

means responsive to the first component of the detected signal being ideally positive and not zero, ideally zero, and ideally negative and not zero for providing a first control signal representing a first fixed value, zero, and a second fixed value, respectively, both of said first and second fixed values being other than zero;

means responsive to the second component of the detected signal being ideally positive and not zero, ideally zero, and ideally negative and not zero for providing a second control signal representing a third fixed value, zero, and a fourth fixed value, respectively, both of said third and fourth fixed values being other than zero;

first means for providing a phase error signal in accordance with a relationship having the values of said control signals in different terms of the numerator, said terms being algebraically summed whereby the phase error signal contains substantially no noise from the first channel at least when the first component of the detected signal is zero and which contains substantially no noise from the second channel at least when the second component of the detected signal is zero; and said phase correction means including means responsive to the phase error signal for at least partially correcting the phase error of the input signal.

2. An apparatus as defined in claim 1 wherein said first means includes means responsive to the first component of the detected signal and the phase corrected signal in the first channel for providing a component of a system error signal in the first channel and means for multiplying the component of the system error signal in the first channel by the first control signal.

3. An apparatus as defined in claim 1 wherein said first means includes means for dividing said numerator by a denominator which includes the absolute value of said first and second components of the detected signal.

4. An apparatus as defined in claim 1 wherein said first means includes means for dividing said numerator by a denominator which includes a reference signal and said detector means is responsive to said reference signal to provide the detected signal.

5. An apparatus as defined in claim 4 including means for providing said numerator with said reference signal whereby the phase error signal is substantially independent of the reference signal.

6. An apparatus as defined in claim 1 wherein said relationship includes $$\frac{EI \, SGN'(DQ) - EQ \, SGN'(DI)}{|DQ| + |DI|}$$

where
$EI$ is the difference between the phase corrected signal in the first channel and the product of the first component of the detected signal and a reference signal,
$EQ$ is the difference between the phase corrected signal in the second channel and the product of the second component of the detected signal and said reference signal,
$SGN'(DQ)$ and $SGN'(DI)$ are the second and first control signals, respectively, and
$|DI|$ and $|DQ|$ are the absolute values of the first and second components of the detected signal, respectively.

7. An apparatus adapted to receive an input signal which contains phase error wherein the apparatus provides a variable reference signal which is an estimate of the level of the input signal, said apparatus comprising:
phase correction means responsive to the input signal for correcting at least some of the phase error to provide a phase corrected signal;
detector means responsive to the phase corrected signal for providing a detected signal;
error calculator means responsive to at least one of the phase corrected signal and the detected signal to provide a first signal which is related to said variable reference signal and first means responsive to the first signal for providing a phase error signal;
said first means including means for dividing the first signal by the variable reference signal whereby the phase error signal is made substantially independent of variations in the reference signal; and
said phase correction means including means responsive to the phase error signal for at least partially correcting of the phase error in the input signal.

8. An apparatus as defined in claim 7 wherein each of the phase corrected signal and the detected signal has first and second components in first and second channels, respectively, each of said components of the detected signal has an ideal value which varies and at least at times equals zero, and said first means provides the phase error signal with substantially no noise from the first channel at least when the component of the detected signal in the first channel is zero and with substantially no noise from the second channel at least when the component of the detected signal in the second channel is zero.

9. An apparatus as defined in claim 8 wherein said first means includes means responsive to the first component of the detected signal being ideally positive and not zero, ideally zero, and ideally negative and not zero for providing a first control signal representing a first fixed value, zero, and a second fixed value, respectively, means responsive to the second component of the detected signal being ideally positive and not zero, ideally zero, and ideally negative and not zero for providing a second control signal representing a third fixed value, zero, and a fourth fixed value, respectively, and means for providing said phase error signal in accordance with a relationship having said control signals in different terms of the numerator whereby the phase error signal contains substantially no noise from the first channel at least when the first component of the detected signal is zero and which contains substantially no noise from the second channel at least when the second component of the detected signal is zero.

10. An apparatus as defined in claim 7 wherein each of said phase correction signal, the detected signal, and said first signal has components in first and second channels, and said error calculator means includes means for multiplying the reference signal and the detected signal in the first channel and algebraically summing the product with the phase corrected signal to provide the component of the first signal in the first channel.

11. An apparatus as defined in claim 10 wherein said error calculator means includes means for multiplying the reference signal and the component of the detected signal in the second channel and algebraically summing the product with the phase corrected signal in the second channel to provide the component of the first signal in the second channel.

12. An apparatus as defined in claim 7 wherein said detected signal has components in first and second channels and the first means includes means for dividing the first signal by the absolute values of the components of the detected signal in the first and second channels.

13. An apparatus as defined in claim 7 wherein said error calculator means is constructed so that the first signal is approximately equal to the reference signal times the phase error of the phase corrected signal.

14. A method of correcting the phase error of an input signal which is representative of data wherein a receiver provides a variable reference signal which is an estimate of the level of the input signal, said method comprising:
correcting at least some of the phase error of the input signal to provide a phase corrected signal;
detecting the data in the phase corrected signal to thereby provide a detected signal;
using at least one of the phase corrected signal and the detected signal to provide a first signal which is approximately equal to the variable reference signal times the phase error of the phase corrected signal;
dividing the first signal by the variable reference signal to provide a phase error signal which is substantially independent of variations in the reference signal; and using the phase error signal to at least assist in the correcting of the phase error in the input signal.

15. A method of correcting the phase error of an input signal which is representative of data comprising:

correcting at least some of the phase error to provide a phase corrected signal having components in first and second channels;

detecting the data in the phase corrected signal to provide a detected signal having first and second components in the first and second channels, respectively, each of said components of the detected signal having an ideal value which can vary from positive to negative and at least at times equals zero;

providing a first control signal representing a first fixed value, zero, and a second fixed value when the first component of the detected signal is ideally positive and not zero, ideally zero, and ideally negative and not zero, respectively, one of said first and second fixed values being positive and the other of said first and second fixed values being negative;

providing a second control signal representing a third fixed value, zero, and a fourth fixed value when the second component of the detected signal is ideally positive and not zero, ideally zero, and ideally negative and not zero, respectively, one of said third and fourth fixed values being positive and the other of said third and fourth fixed values being negative;

providing a phase error signal in accordance with a relationship having the values of said control signals in different terms of the numerator and algebraically summing said terms whereby the phase error signal contains substantially no noise from the first channel at least when the first component of the detected signal is zero and which contains substantially no noise from the second channel at least when the second component of the detected signal is zero; and using the phase error signal to at least partially correct the phase error of the input signal.

16. A method as defined in claim 15 wherein said step of providing a phase error signal includes subtracting from the component of the phase corrected signal in the first channel the product of the first component of the detected signal and a reference signal to provide a system error signal in the first channel, subtracting from the component of the phase corrected signal in the second channel the product of the second component of the detected signal and said reference signal to provide a component of the system error signal in the second channel, multiplying the component of the system error signal in the first channel by the first control signal to provide a first channel product, multiplying the component of the system error signal in the second channel by the second control signal to provide a second channel product, subtracting the first channel product from the second channel product and dividing the difference by the sum of the absolute values of the detected signal in the first and second channels.

17. A method as defined in claim 15 wherein said step of detecting includes comparing the level of the phase corrected signal with a variable reference signal and said last-mentioned step of providing includes dividing by said variable reference signal.

18. An apparatus as defined in claim 7 including equalizer means responsive to said reference signal for substantially equalizing the input signal whereby the input signal introduced to the phase correction means is substantially equalized.

* * * * *